US006957338B1

(12) United States Patent
Sumino

(10) Patent No.: US 6,957,338 B1
(45) Date of Patent: Oct. 18, 2005

(54) INDIVIDUAL AUTHENTICATION SYSTEM PERFORMING AUTHENTICATION IN MULTIPLE STEPS

(75) Inventor: Toru Sumino, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/487,726

(22) Filed: Jan. 19, 2000

(30) Foreign Application Priority Data

Jan. 20, 1999 (JP) .................................. 11-012452

(51) Int. Cl.[7] ............................. H04K 1/00; H04L 9/00
(52) U.S. Cl. ........................ 713/186; 713/182; 713/202
(58) Field of Search ................................ 713/186, 170, 713/171, 172, 173, 174, 159, 202, 182; 382/116, 382/124; 348/161

(56) References Cited

U.S. PATENT DOCUMENTS

| 5,485,519 | A | * | 1/1996 | Weiss .......................... 713/185 |
| 5,987,155 | A | * | 11/1999 | Dunn et al. .................. 382/116 |
| 5,991,408 | A | * | 11/1999 | Pearson et al. .............. 713/186 |
| 6,003,135 | A | * | 12/1999 | Bialick et al. ............... 713/201 |
| 6,035,406 | A | * | 3/2000 | Moussa et al. .............. 713/202 |
| 6,173,400 | B1 | * | 1/2001 | Perlman et al. .............. 713/172 |
| 6,219,439 | B1 | * | 4/2001 | Burger ........................ 382/115 |
| 6,257,486 | B1 | * | 7/2001 | Teicher et al. ............... 235/380 |
| 6,611,916 | B1 | * | 8/2003 | Cacace-Bailey et al. .... 713/201 |

FOREIGN PATENT DOCUMENTS

| JP | 63-36468 | 2/1988 | |
| JP | 2-118790 | 5/1990 | |
| JP | 2-173869 | 7/1990 | |
| JP | 3-58174 | 3/1991 | |
| JP | 7-64911 | 3/1995 | |
| JP | 7-234940 | 9/1995 | |
| JP | 8-171535 | 7/1996 | |
| JP | 10-161979 | 6/1998 | |
| JP | 10-240691 | 9/1998 | |
| JP | 10-255005 | 9/1998 | |
| JP | 10240691 A | * 9/1998 | ........... G06F 15/00 |

* cited by examiner

Primary Examiner—Ayaz Sheikh
Assistant Examiner—Kaveh Abrishamkar
(74) Attorney, Agent, or Firm—Sughrue Mion, PLLC

(57) ABSTRACT

An individual authentication system is disclosed, by which the data processing device which needs the individual authentication can be used and managed with higher security. The individual authentication system for authenticating the user of a data processing device storing a password comprises an individual authentication card for storing biological information and a password for identifying a registered user; a card reader for reading out and outputting the biological information and the password stored in the card; a biological information input device for inputting biological information from a user and outputting the information; and a collating unit for respectively collating the biological information and the password output from the card reader with the biological information output from the biological information input device and the password stored in the data processing device.

7 Claims, 2 Drawing Sheets

INDIVIDUAL AUTHENTICATION SYSTEM PERFORMING AUTHENTICATION IN MULTIPLE STEPS

BACKGROUND OF THE INVENTION

1. Field of the Invention

The present invention relates to an individual authentication system, in particular, one suitably used for authenticating a user when a data processing device is activated.

This application is based on Patent Application No. Hei 11-12452 filed in Japan, the contents of which are incorporated herein by reference.

2. Description of the Related Art

As computers have become more common, many problems relating to illegal computer usage have increased, such as illegal theft or falsification of data, or pretenses by a third party to be a user. In general measures conventionally implemented for coping with these problems, the user must input a password such as a personal and secret identification number. However, such a password is nothing but personal knowledge; thus, it may be leaked or may be stolen by an illegal user.

In consideration of the above problem, many individual authentication systems using an IC card which stores individual information or the like have been developed, and some of them have been practically used. In such systems using the IC card, generally, a password must be input for accessing the contents of the card; thus, the safety of the system is higher than the individual authentication system using only a password.

However, even in the individual authentication system using the IC card, if both the IC card (a physical object) and the password (individual knowledge) are stolen, the safety is not secured also in this case.

On the other hand, individual biological information data such as fingerprints are different for each person; thus, such information has recently received attention for identifying an individual. However, in this authentication method, the biological information may be changed if the user suffers an injury, or may be misidentified according to the performance of the system.

SUMMARY OF THE INVENTION

In consideration of the above circumstances, an object of the present invention is to provide an individual authentication system by which the data processing device which needs individual authentication can be used and managed with higher security.

Therefore, the present invention provides an individual authentication system for authenticating the user of a data processing device storing a password, comprising:

an individual authentication card for storing biological information and a password for identifying a registered user;

a card reader for reading out and outputting the biological information and the password stored in the card;

a biological information input device for inputting biological information from a user and outputting the information; and a collating unit for respectively collating the biological information and the password output from the card reader with the biological information output from the biological information input device and the password stored in the data processing device.

According to the above structure, data collation with respect to the biological information and the password is performed so that the individual authentication can be realized in multiple steps and illegal usage by an illegal (i.e., not registered) user can be prevented.

The data processing device may have an identification number input device by which the user inputs an identification number. In this case, the card stores an identification number for identifying the registered user, and has a function of collating the stored identification number with the identification number input by the identification number input device.

Typically, the biological information is fingerprint data, and preferably, a plurality of fingerprint data.

Typically, the card is an IC card storing at least the biological information and the password for identifying a registered user as electric signals.

Preferably, one or both of the biological information and the password are encrypted using an encrypting algorithm.

If an identification number is used, preferably, one or more of the biological information, the password, and the identification number are encrypted using an encrypting algorithm.

It is possible that the card reader, the identification number input device, and the biological information input device are integrated in a single device.

According to the present invention, the data processing device which needs the individual authentication of the user can be used and managed with much more reliable security.

DESCRIPTION OF THE PREFERRED EMBODIMENTS

Hereinafter, an embodiment of the individual authentication system according to the present invention will be explained with reference to the drawings.

Figure 1:
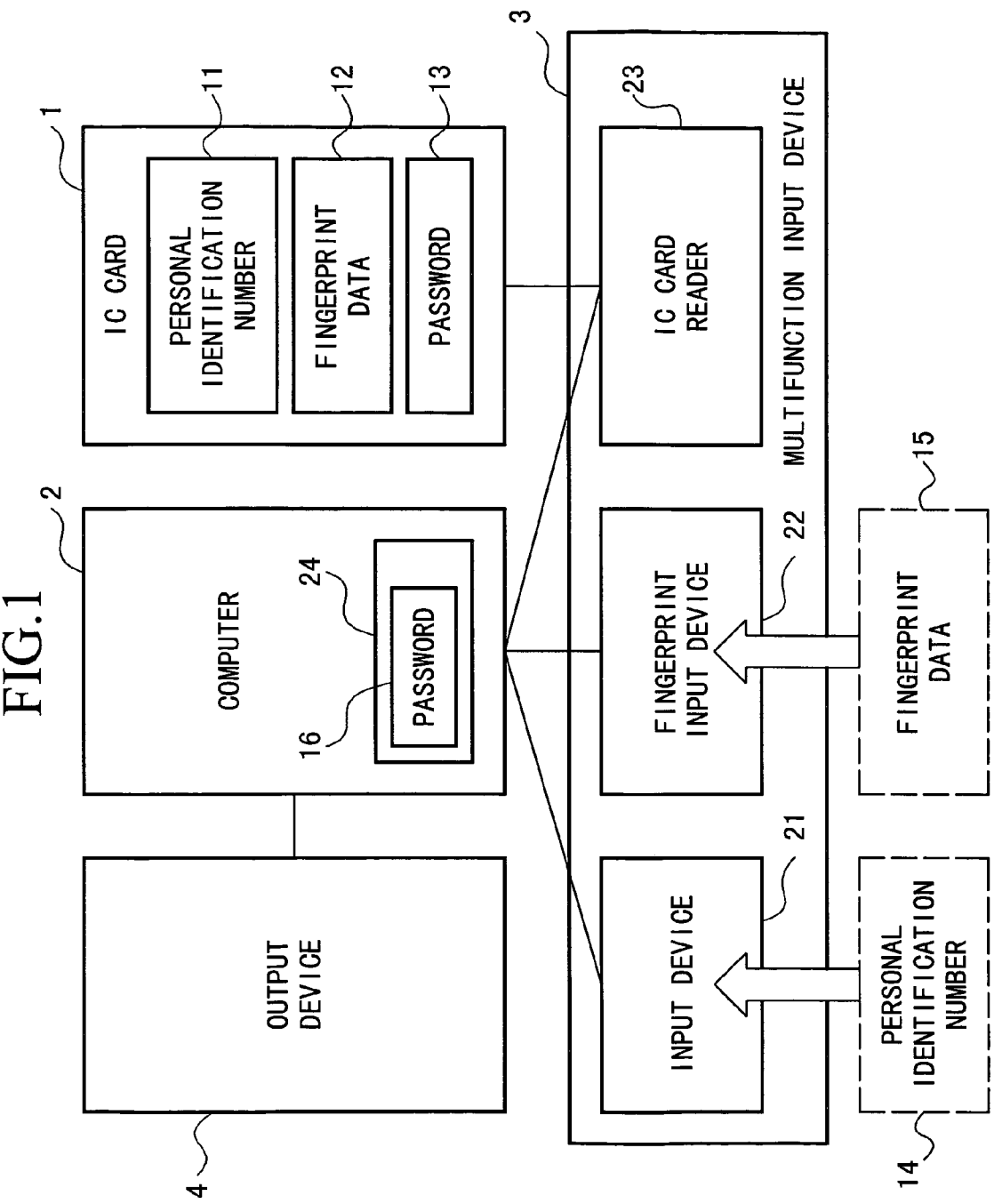
FIG. 1 is a diagram showing the general structure of the computer system employing the individual authentication system of an embodiment according to the present invention.

FIG. 1 is a diagram showing the general structure of the computer system employing the individual authentication system of the embodiment. This system comprises IC card 1 for storing individual information used for identifying the registered user, computer (i.e., data processing device) 2 which needs individual authentication of the user and is operated by the program control, multifunction input device 3 having functions of inputting (or detecting) the fingerprint and the IC card, and output device 4 having a display function for outputting or showing the results of the program processing performed by the computer 2.

In IC card 1, information data such as personal (and secret) identification number (i.e., identification number) 11, fingerprint data (i.e., biological information) 12, password 13 for activating the computer 2, and the like are stored.

The multifunction input device 3 includes input device 21 for inputting personal identification number 14 (i.e., identification number input device), fingerprint input device (i.e., biological information input device) 22 for inputting the fingerprint data (i.e., biological information) 15 as a graphic data, and IC card reader 23 for reading out personal identification number 11, fingerprint 12, password 13, and the like, from the IC card 1.

In computer 2, password 16 for identifying the user is registered, and the computer has a collating unit 24 for collating the data output from the IC card reader 23 such as fingerprint data 12 and password 13 with the fingerprint data 15 output from the fingerprint input device 22 and password 16 registered in the computer 2. The results collated by the collating unit 24 are output or displayed by output device 4.

The IC card 1 has a protecting function of checking the personal identification number 11 and controlling the access to the fingerprint data 12 and password 13 according to the checked result, and a collating function of collating the personal identification number 14 input from the personal identification number input device 21 with the personal identification number 11 stored in the IC card 1.

Figure 2:
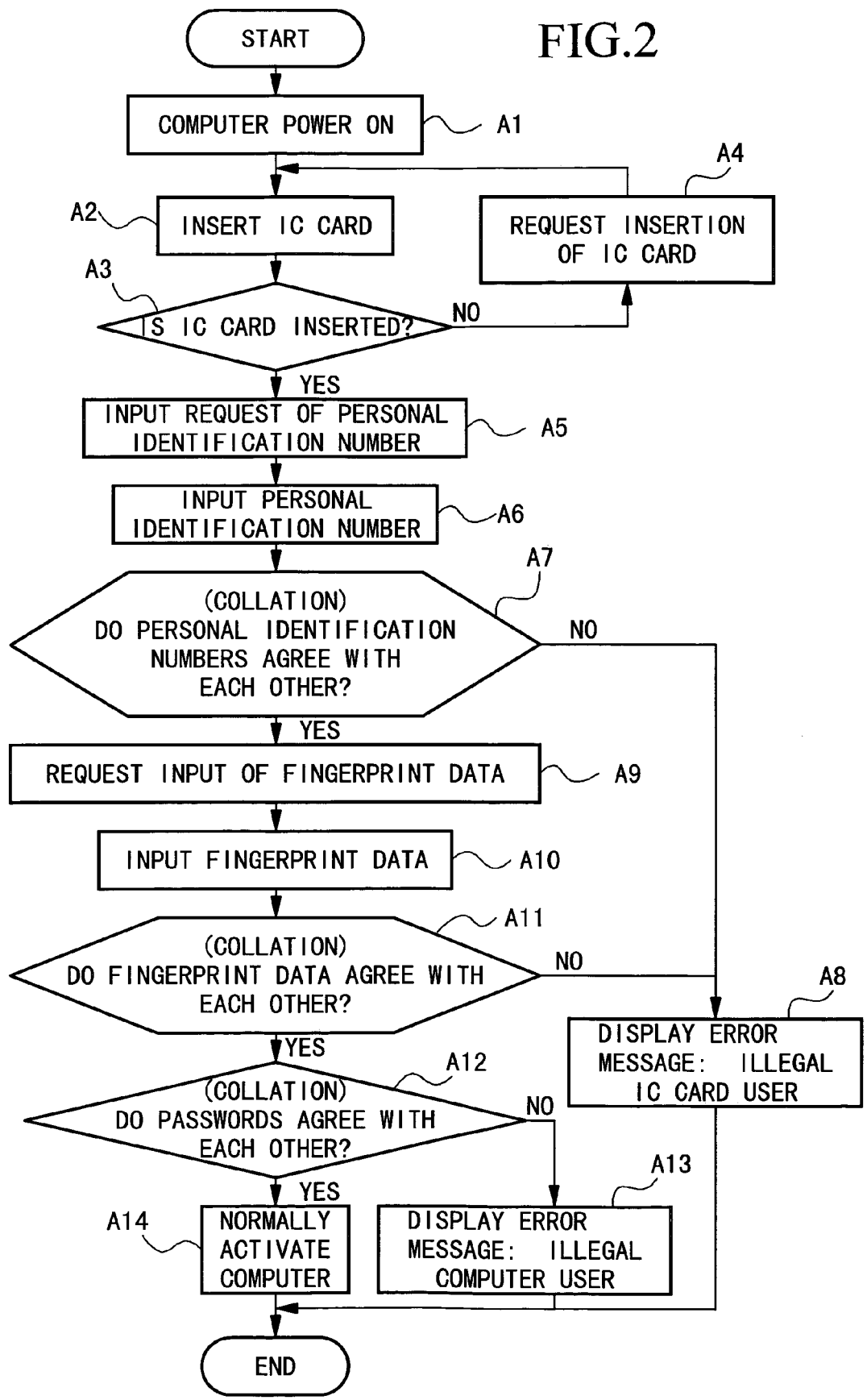
FIG. 2 is a flowchart showing the operation of the computer system employing the individual authentication system of the above embodiment.

The operation of this computer system will be explained with reference to FIGS. 1 and 2.

First, the user of the computer 2 turns the power switch of the computer on (see step A1), and inserts the IC card 1 into the IC card reader 23 (see step A2).

Next, it is determined whether the IC card 1 is normally inserted (see step A3), and if the card is not normally inserted, then a message for requesting the insertion of the IC card 1 is displayed in the output device 4 (see step A4). If the IC card 1 is normally inserted, the operation proceeds to the next step.

In the next step, a message for requesting input of personal identification number 14, which is necessary for accessing the fingerprint data 12, password 13, and the like, stored in the IC card 1, is displayed in the output device 4 (see step A5). The user then inputs the personal identification number 14 using the personal identification number input device 21 (see step A6). The input personal identification number 14 is sent via computer 2 to the IC card reader 23, and the personal identification number 14 is collated by IC card 1 with the stored personal identification number 11 (see step A7).

If both personal identification numbers 11 and 14 do not agree with each other, a message indicating that the current user is not a legal user of IC card 1 is displayed in the output device 4, and the operation for activating the computer 2 is terminated (see step A8).

In contrast, if both personal identification numbers 11 and 14 agree with each other, the operation proceeds to the next step. Here, the fingerprint 12 and the password 13 for activating the computer, stored in the IC card reader 23, are protected using the personal identification number 11; thus, if the above collation fails (that is, both data do not agree with each other), the stored data cannot be read out.

In the next step, the computer 2 displays in the output device 44 a message for instructing the user to put a (predetermined) finger on the fingerprint input device 22 (see step A9), and the fingerprint data 15 is input into the computer 2 (see step A10). The input fingerprint data 15 and the fingerprint data 12 stored in the IC card 1 are then collated by computer 2 (see step A11). If the collated fingerprint data 12 and 15 do not agree with each other, a message indicating that the current user is not a legal user of the IC card 1 is displayed in the output device 4, and the operation for activating the computer 2 is terminated (see step A8), while if both data agree with each other, the operation proceeds to the next step.

In the last process, the computer 2 reads out the password 13 (in IC card 1) for activating the computer by the built-in collating unit 24, and collates the password 13 with the password 16 stored in the computer 2 (see step A12).

If both passwords 13 and 16 do not agree with each other, a message indicating that the current user is not a legal user of computer 2 is displayed in the output device 4, and the operation for activating the computer is terminated (see step A13). While if the passwords 13 and 16 agree with each other, the activating operation of the computer 2 is continued (see step A14).

According to the computer system of the present embodiment, the individual authentication is performed in multiple steps such as sequential collation processes between a set of personal identification number 11, fingerprint data 12, and password 13 for activating computer 2, stored in IC card 1, and a set of personal identification number 14 input from the personal identification number input device 21, fingerprint data 15 input from fingerprint input device 22, and password 16 registered in computer 2. Therefore, it is possible to effectively prevent an illegal user from illegally using the computer.

In addition, the personal identification number input device 21, fingerprint input device 22, and IC card reader 23 are integrated in a single multifunction input device 3; thus, only a single communication line is necessary between the computer 2 and the multifunction input device 3, thereby much more efficiently preventing leakage of data by tapping, or the like.

An embodiment of the computer system employing the individual authentication according to the present invention has been explained above with reference to the drawings; however, the embodiments are not limited to the above and any variation including design modification or the like is possible within the spirit and scope of the claimed invention.

For example, in the above embodiment, single fingerprint data 12 is stored in the IC card 1; however; a plurality (or plural kinds) of fingerprint data 12 may be stored in the IC card 1. In this case of having a plurality of fingerprint data, even if a part of fingerprint data 12 becomes ineffective due to an injury to the user or the like, the individual authentication can be performed using the remaining fingerprint data.

In addition, relevant data such as the personal identification number 14 input from input device 21, fingerprint data 15 input from fingerprint input device 22, password 16 (for activating the computer) stored in computer 2, and personal identification number 11, fingerprint 12, and password 13 (for activating the computer) stored in IC card 1 may be encrypted using a known algorithm. In this case, personal information data sent and received between each relevant device are encrypted, thereby much more reliably preventing leakage of data by tapping, or the like.

What is claimed is:

1. An individual authentication system for authenticating the user of a data processing device storing a password, comprising:

an individual authentication card for storing biological information and a password for identifying a registered user;

a card reader for reading out the biological information and the password stored in the card;

a biological information input device for inputting biological information from a user; and means for respectively collating the biological information and the password read from the card reader with the biological information from the biological information input device and the password stored in the data processing device, wherein the data processing device has an identification number input device by which the user inputs an identification number; and the card stores an identification number for identifying the registered user, and has a function of collating the stored identification number with the identification number transmitted by the identification number input device.

2. An individual authentication system as claimed in claim 1, wherein the biological information is fingerprint data.

3. An individual authentication system as claimed in claim 2, wherein the biological information is a plurality of fingerprint data.

4. An individual authentication system as claimed in claim 1, wherein the card is an IC card storing at least the biological information and the password for identifying a registered user as electric signals.

5. An individual authentication system as claimed in claim 1, wherein one or both of the biological information and the password are encrypted using an encrypting algorithm.

6. An individual authentication system as claimed in claim 1, wherein one or more of the biological information, the password, and the identification number are encrypted using an encrypting algorithm.

7. An individual authentication system as claimed in claim 1, wherein the card reader, the identification number input device, and the biological information input device are integrated in a single device.

* * * * *